Sept. 1, 1964     H. H. FREEMAN     3,146,664
INDICIA PROJECTION SYSTEM
Filed Feb. 6, 1961
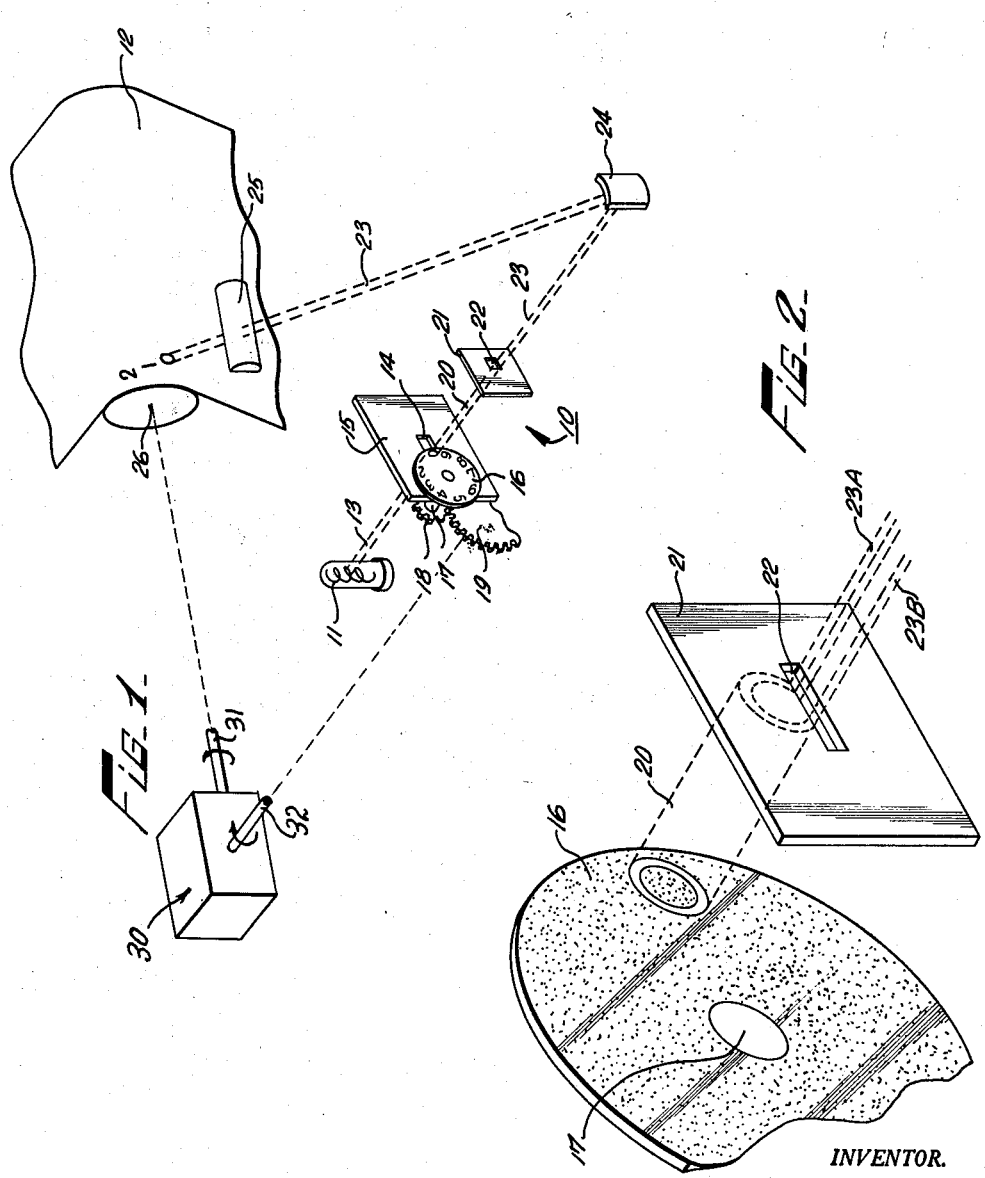
INVENTOR.
HOLLAND H. FREEMAN
BY Christie, Parker & Hale
ATTORNEYS.

United States Patent Office 3,146,664
Patented Sept. 1, 1964

3,146,664
INDICIA PROJECTION SYSTEM
Holland Hedges Freeman, Sierra Madre, Calif., assignor to Consolidated Electrodynamics Corporation, Pasadena, Calif., a corporation of California
Filed Feb. 6, 1961, Ser. No. 87,319
4 Claims. (Cl. 88—24)

The present invention relates to a system and apparatus for the projection of indicia onto a surface, and is especially applicable to the projection of indicia upon a moving surface of direct print photographic paper.

Various systems of indicia projection are well known and have been utilized to project indicia onto both fixed surfaces and moving surfaces. However, such systems as have been used heretofore have required a comparatively complex timing system and a large number of components in order to provide for indicia projection. In addition, in such systems, special optical arrangements have been necessary in order to provide for optimum indicia clarity. Therefore, while such systems are practical and have been successfully used, they have been comparatively expensive and required complex synchronization in order to provide accurate projection.

According to the present invention, transparent indicia are provided on a rotary member onto which a portion of light from a light source falls, so as to pass through only the transparent portions of the member corresponding to the particular indicium to be projected. Means are provided to control the rotation of the member, so that the light falls upon the appropriate indicium. The light passing through the member and corresponding to the indicium to be projected then falls upon a scanning aperture plate. The scanning aperture plate has a narrow slot therein, through which passes a portion of the light corresponding to the indicium to be projected. The light emerging from this slot then falls upon the surface onto which the indicium is to be projected, either directly or by reflection.

If the surface upon which the indicium is to be propected is moving, the slot corresponds to only a small portion of the indicium to be projected. The rotary member is then rotated so as to provide a scanning effect, in that light corresponding to the entire portion of the indicium is sequentially passed through the slot so as to fall upon the moving surface to form the indicium. However, if the surface is stationary, the slot is made sufficiently large so that light corresponding to the entire indicia passes through the slot simultaneously, and falls upon the surface to form the indicium instantaneously. In the latter embodiment, it may be desirable to flash the light source, as appropriate, when the rotary member is properly positioned, so as to project the entire indicia instantaneously. Any one of a number of well known systems are utilizable to control the rotation of the rotary member, and the particular system used for such control forms no part of the present invention.

The invention may be more readily understood by referring to the accompanying drawing in which:

FIGURE 1 is a view in perspective of a system for projecting indicia according to the present invention; and, FIGURE 2 is an enlarged view of the rotary member and scanning plate according to the present invention.

Referring now to FIG. 1, there is shown an indicia projection apparatus 10, which includes a light source 11 and a moving surface 12 of direct print photographic paper. Light, indicated by a dotted line 13, from the light source 11, passes through an opening 14 in a mounting plate 15. An indicia member 16 is connected to the mounting plate 15 by means of an axle 17, to which is also attached a first drive gear 18. A second drive gear 19 meshes with the first gear 18 and is utilized in conjunction with control means 30 of conventional construction to control the relative rotary disposition of the rotary member 16. The rotary member 16 has indicia thereon, illustrated, by way of example, as the numbers 0 to 9, which are formed as transparent portions in an opaque surface. For example, the indicia may consist of photographic negatives of the numbers 0 to 9 mounted on a suitable transparent support, so that light may pass through the clear portions of the negative corresponding to each of the numbers.

The light passing through the rotary member 16 is indicated by a dotted line 20, and corresponds to the configuration of the particular number through which it has passed. The dimension of the opening 14 is such as to shield the remainder of the rotary member 16 from the light 13. This light beam 20 then falls upon a scanning plate 21 which has a scanning slot 22 therein. The scanning slot 22 is a comparatively narrow slot, so that only a portion of the light beam 20 passes therethrough. The light passing through the scanning plate slot 22 is indicated by the dotted line 23 and falls upon a mirror 24, from which it is reflected through an imaging lens 25 and onto the paper 12 at a point opposite a roller 26. The roller 26 is utilized to insure that a fixed distance exists between the paper 12 and mirror 24.

As shown in FIGURE 1, the numbers 2 and 1 have already been projected onto the direct print paper 12 and "latensified" to such an extent by exposure to light that the images thereof have been rendered visible. Thus it will be apparent that the rotary number 16 is being rotated in a counterclockwise direction and the paper is being moved upwardly in respect to the projection system 10. However, if desired, either or both of these directions of movement could be reversed without significant change in the performance of the system. If desired, the configuration of the indicia may be altered for the particular directions of movement, in order to compensate for the lengthening or shortening of the indicia which might otherwise occur if the indicia were of standard configuration. Control means 30 of conventional construction is shown in FIG. 1 coupled between gear 19 and roller 26. The control means may be a commercially available mechanical transmisison having input and output shafts 31 and 32, respectively. The control means is operable to vary the rate of movement of indicia member 16 past aperture 22 in response to changes in the velocity of paper 12 so as to reduce distortion of a latent image recorded on the paper should the velocity of the paper be non-uniform.

In FIGURE 2, an enlarged view of the rotary member 16 and scanning aperture plate 21 is shown. For purposes of clarity, only the number 0 is shown on the rotary member 16. The light beam 20 passing through the transparent portions of the 0 falls upon the scanning aperture plate 21. The lower portion of this light beam 20 passes through the slot 22 in the form of two individual beams 23A and 23B, corresponding to the portions of the two sides of the 0 being projected.

As is shown in the drawing, both a mounting plate 15 and scanning aperture plate 21 are utilized. If desired, these two plates can be combined, so that, in effect, a narrow slot corresponding to the slot 22 is provided between the source of light 11 and rotary member 16. In such an embodiment, the light passing through the rotary member 16 then corresponds to only a portion of the indicia to be projected, and the rotation of the rotary member 16 provides for the scanning effect. Thus, the indicium is sequentially projected. In an embodiment in which the surface onto which the indicia is to be projected is stationary at the time of projection, the scanning plate 21 and scanning plate slot 22 are omitted, so that the light passing through the slot 14 in the mounting plate 15 coincides with the entire indicia to be projected, thereby projecting the complete indicia instantaneously onto the surface 12.

The mirror 24 is shown as being utilized to reflect the light beam 23 onto the paper 12. However, if desired, the mirror 24 can be eliminated, and the projection apparatus 10 aligned so as to project indicia directly onto the desired surface. In addition, the imaging lens 25 may be dispensed with, if desired. In addition, the mirror 24 may be shaped to provide for focussing of the indicia projected onto the paper 12.

The use of the mirror 24 provides for additional flexibility in the system, in that the mirror 24 may be manually adjusted so as to project the indicia upon a selected portion of the paper 12. Thus, by selecting the angular displacement of the mirror, the portion of the lens and therefore the surface 12 onto which the indicia are projected may be selected.

While the member 16 has been shown as disc-shaped, a continuous band may also be used in the practice of the present invention.

The invention claimed is:

1. Apparatus for projecting indicia on a moving photo-sensitive surface comprising a source of illumination, a plurality of indicia-forming transparencies, a plate defining a slot aperture therethrough disposed the transparencies from the source of illumination, means for moving the transparencies relative to the plate aperture so that the indicium formed by a selected transparency progressively passes the aperture, the aperture having a width in the direction of relative movement of the transparencies substantially less than the dimensions of the indicia in the same direction, and a mirror disposed opposite the plate from the transparencies for reflecting light passing the aperture to the surface, the transparencies and the plate aperture and the mirror being disposed with respect to the source of illumination and the moving photo-sensitive surface so that light from the source passing through a transparency aligned with the aperture falls on the surface and progressively records on the surface a latent image of the indicia formed by the transparency.

2. Apparatus according to claim 1, and including an imaging lens, the lens being disposed between the mirror and the moving photo-sensitive surface so that light reflected by the mirror passes through the lens and is brought to a focus on the photo-sensitive surface.

3. Apparatus according to claim 2 in which the lens is a cylindrical lens.

4. Apparatus according to claim 1 including means for varying the rate of indicia movement in response to changes in the velocity of the moving photo-sensitive surface so as to reduce distortion of the latent image recorded.

References Cited in the file of this patent

UNITED STATES PATENTS

| | | |
|---|---|---|
| 1,692,347 | Owens | Nov. 20, 1928 |
| 2,084,450 | Paris | June 22, 1937 |
| 2,474,303 | Davis | June 28, 1949 |
| 2,614,460 | Miller | Oct. 21, 1952 |
| 2,677,306 | Dodeman et al. | May 4, 1954 |
| 2,841,062 | O'Brien | July 1, 1958 |
| 3,081,458 | Lee | Mar. 12, 1963 |

FOREIGN PATENTS

| | | |
|---|---|---|
| 669,609 | Great Britain | Apr. 2, 1952 |
| 961,567 | France | Nov. 21, 1949 |

UNITED STATES PATENT OFFICE
CERTIFICATE OF CORRECTION

Patent No. 3,146,664                      September 1, 1964

Holland Hedges Freeman

It is hereby certified that error appears in the above numbered patent requiring correction and that the said Letters Patent should read as corrected below.

Column 1, lines 40 and 41, for "propected" read -- projected --; column 3, line 28, after "disposed" insert -- opposite --.

Signed and sealed this 26th day of January 1965.

(SEAL)
Attest:

ERNEST W. SWIDER                      EDWARD J. BRENNER
Attesting Officer                       Commissioner of Patents